United States Patent [19]
Chambley

[11] 3,919,886
[45] Nov. 18, 1975

[54] METHOD AND APPARATUS FOR MEASURING YARN TWIST SET

[75] Inventor: Phillip W. Chambley, Rome, Ga.

[73] Assignee: Champion International, Stamford, Conn.

[22] Filed: June 11, 1974

[21] Appl. No.: 478,266

[52] U.S. Cl.................................. 73/160; 73/99
[51] Int. Cl.² ........................................ G01L 5/04
[58] Field of Search ............... 73/99, 103, 158, 160

[56] References Cited
UNITED STATES PATENTS

| | | | |
|---|---|---|---|
| 1,928,271 | 9/1933 | Smith | 73/158 |
| 2,856,769 | 10/1958 | Bennett et al. | 73/99 |
| 3,672,212 | 6/1972 | Caspary et al. | 73/99 |

FOREIGN PATENTS OR APPLICATIONS

| | | | |
|---|---|---|---|
| 959,220 | 9/1949 | France | 73/99 |
| 1,115,456 | 1/1956 | France | 73/99 |
| 22,660 | 10/1893 | United Kingdom | 73/160 |

Primary Examiner—Richard E. Algerter
Assistant Examiner—Richard R. Stearns
Attorney, Agent, or Firm—Evelyn M. Sommer

[57] ABSTRACT

Rotatable clamps are provided for gripping the ends of a given length of yarn. One clamp is mounted for rotation in one direction relative to the other clamp to remove the twist in the yarn sample. The other clamp is releasable for free rotation under the impetus of the yarn recovering its elastically remembered twist. In one embodiment a counter is provided with manually operable stepping means for counting the number of revolutions of the released clamp. Additional indicating means is associated with said other clamp to indicate fractional revolutions. In a second embodiment the counter is replaced by an electric tachometer coupled to said other clamp for providing a signal proportional to the angular velocity thereof.

8 Claims, 7 Drawing Figures

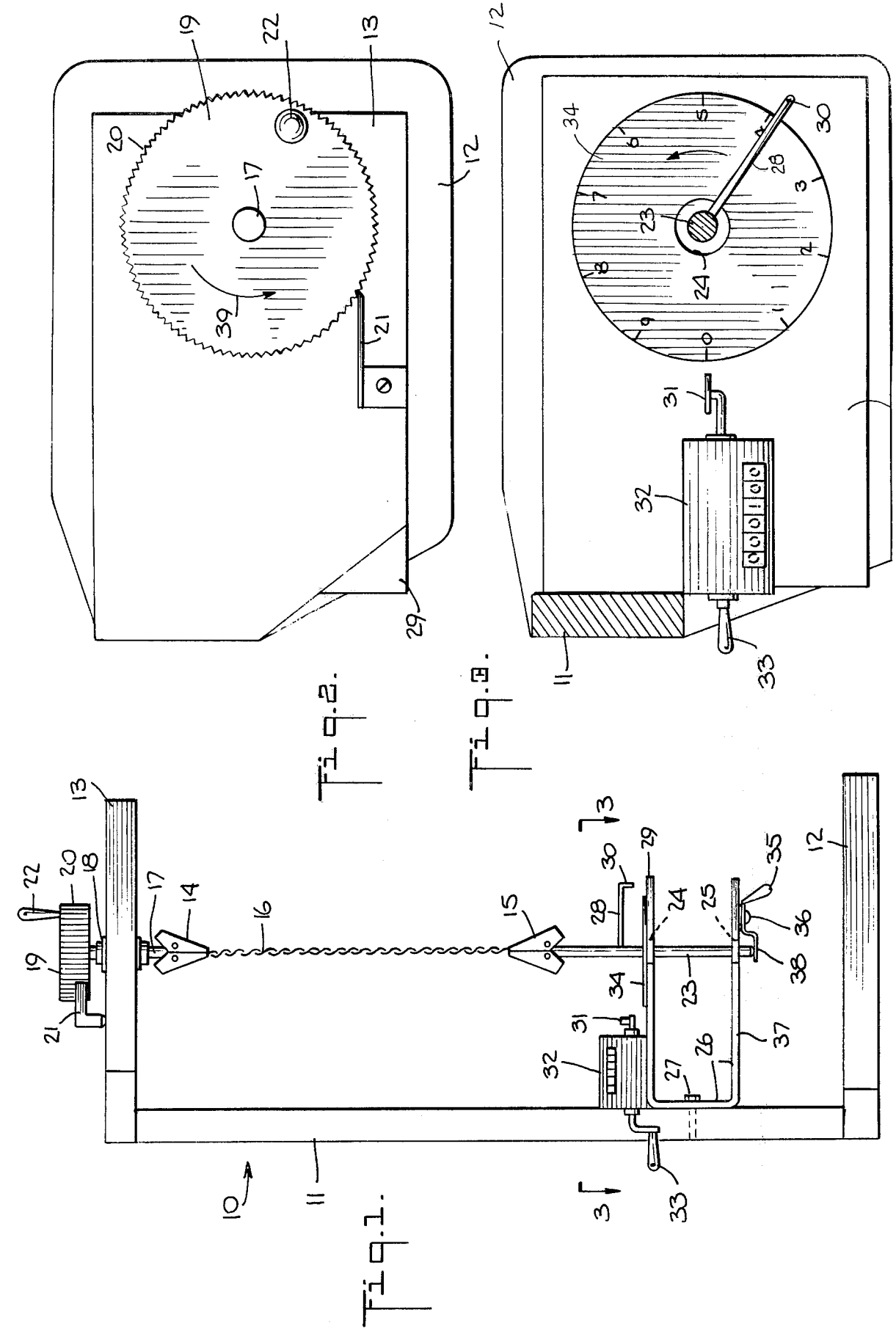

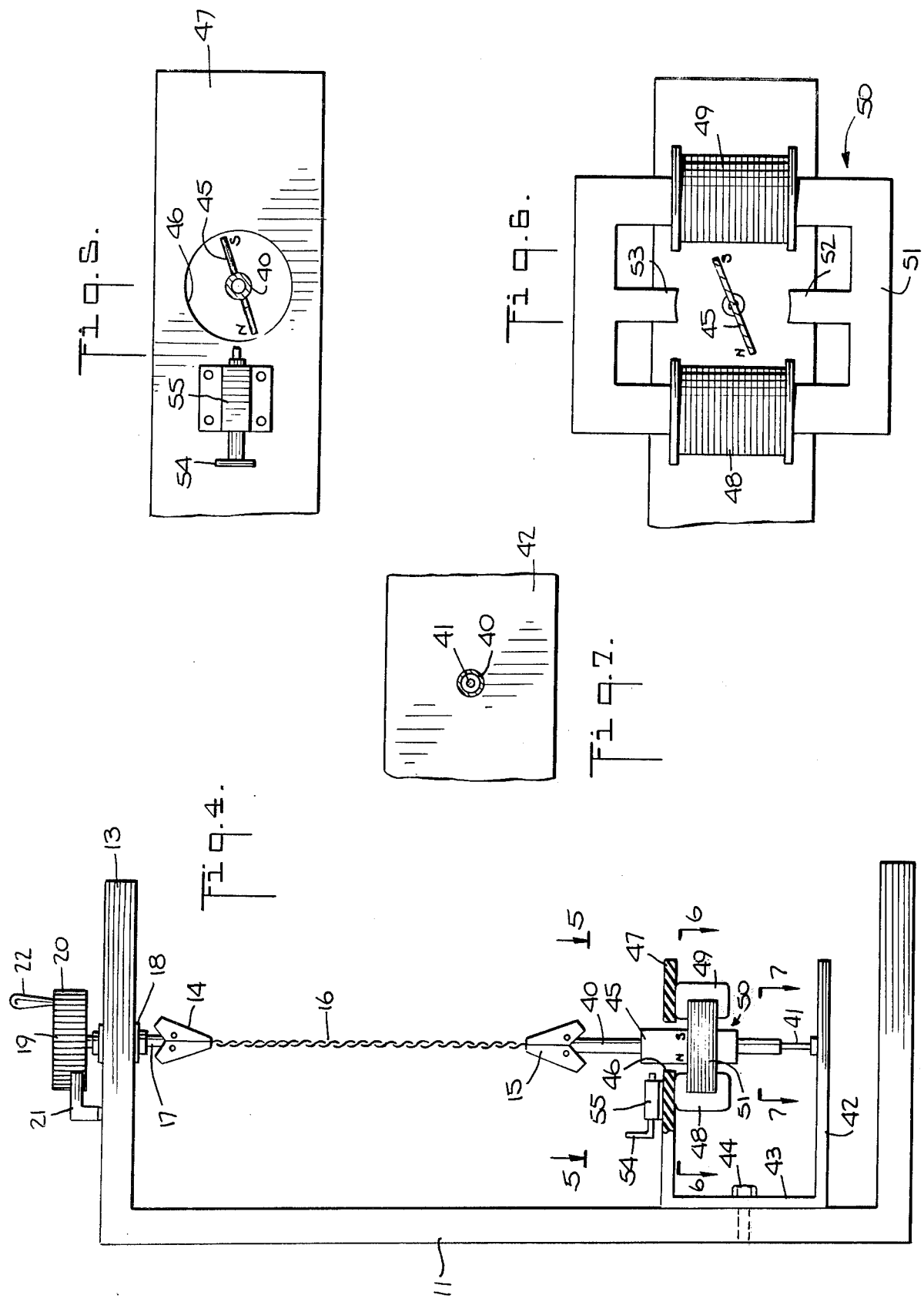

METHOD AND APPARATUS FOR MEASURING YARN TWIST SET

The present invention relates to yarn twist measurement and, more particularly, to a method and apparatus for measuring twist set, as opposed to twist, in yarns, especially those utilized in carpet manufacture.

In cut pile carpeting, appearance and wearability are to a certain extent dependent upon the ability of the yarn in the pile to retain its twist. The yarn in a carpet in use is repeatedly assaulted by a host of attackers such as the tread of feet, the movement of furniture, the abrasion of cleaning implements, and the like. If the yarn untwists it tends to become frayed and of uneven length thereby degrading the surface texture and appearance. Hence, one of the characteristics associated with good quality in carpeting is the resistance of the yarn to untwisting. This characteristic is a function of the elastic memory or "twist set" of the yarn.

Heretofore, the carpet industry has generally settled for a subjective rating of yarn twist retention in carpeting. For this purpose tuft tip definition is compared with a standard, but this comparison is made after tufting the carpet. If a particular yarn lot has poor twist retention characteristics, i.e., twist set, this does not reveal itself until the carpet is fabricated, and the resultant product cannot be sold as first grade merchandise.

Devices are known for determining yarn twist by counting the number of turns or twists in a given length of yarn. But as far as is presently known, there are no devices or methods for testing the torsional properties in yarn, particularly before it is incorporated in a carpet structure.

Therefore, it is an object of the present invention to provide a method for measuring twist set in yarn. A further object of the invention is to provide apparatus capable of measuring twist set. Other objects will be readily apparent to those skilled in the art.

In accordance with one aspect of the invention there is provided the method of measuring twist set in yarn which comprises the steps of untwisting a predetermined length of yarn until it is free from twist, thereafter permitting said length of yarn to recover freely whatever twist is elastically retained therein, and determining the amount of twist so recovered.

In accordance with a further aspect of the subject invention there is provided apparatus for measuring the aforesaid twist set in yarn which comprises in combination first means for mounting a length of yarn, means coupled thereto for manipulating said first means to untwist said yarn, means for releasing said first means for permitting said yarn to recover without restraint all twist elastically retained therein, and means for providing an indication of the amount of twist so recovered.

The invention will be better understood after reading the following detailed description of the presently preferred embodiments thereof with reference to the appended drawings in which:

FIG. 1 is a vertical elevational view of one embodiment of a twist set measuring device in accordance with the invention;

FIG. 2 is a top plan view of the embodiment of FIG. 1;

FIG. 3 is a sectional view taken along the line 3—3 of FIG. 1;

FIG. 4 is a view similar to FIG. 1 showing a modified embodiment of the invention;

FIG. 5 is a fragmentary sectional view taken along the line 5—5 in FIG. 4;

FIG. 6 is a fragmentary sectional view taken along the line 6—6 in FIG. 4; and

FIG. 7 is a fragmentary sectional view taken along the line 7—7 in FIG. 4.

Referring now to the drawings, the same reference numerals are used throughout to designate the same or similar parts.

Now referring specifically to FIGS. 1 to 3, there is shown a device designated generally by the reference numeral 10 for measuring twist set in accordance with the subject invention. The device includes a standard 11 having a suitable stable foot or base 12 and an upper horizontal arm or platform section 13. A pair of yarn clamps 14 and 15 constitute spaced apart means for mounting a standard length of yarn 16 which is to be tested. The upper clamp 14 is mounted at the lower end of a shaft 17 journaled in a bearing 18 which is secured in the arm 13 of the standard. The upper end of the shaft 17 is provided with a wheel 19 having a serrated edge 20 which cooperates with a detent finger 21 mounted on the arm 13 of the standard. A crank handle 22 is secured to the wheel 19 near the periphery thereof.

The lower yarn clamp 15 is mounted at the top of a thin rod 23 which passes through apertures 24 and 25 in a "U" shaped frame member 26 bolted at 27 to the standard 11. A horizontal arm 28 is secured at one end to the rod 23 above the horizontal platform portion 29 of the frame member 26. The arm 28 has a depending portion 30 at its outer extremity which is arranged to encounter a stop 31 on the end of a cycling shaft projecting from a counter mechanism 32 which is mounted on the platform portion 29 of the frame member 26, as shown. The opposite end of the cycling shaft projects from the counter 32 on the left side as seen in the drawing and terminates in a manually manipulable lever element 33. The arm 28, in addition to cooperating with the stop 31 on the counter 32, also cooperates with a calibrated circle or disk 34 secured to the top surface of platform portion 29 of bracket 26. Finally, a lever 35 is pivotally joined at 36 to the undersurface of the bottom section 37 of the bracket 26 such that a lateral extension 38 thereof can be manipulated under the lower end of the rod 23 to support the latter. Alternatively, the lever 35 can be pivoted so that its extension 38 clears the end of the rod 23 permitting the latter to move down under its own weight restrained solely by the yarn 16.

In operation of the device 10, the lever 35 is manipulated to place its extension 38 under the rod 23 supporting the same. The standard length of yarn, 16, is secured in the clamps 14 and 15 so as to extend therebetween. There is no standard specification for yarn twist set, but it is presently preferred that yarn 16 have a length in the range of 10 to 30 inches. It will be understood, of course, that the selected length will become a standard for the particular apparatus and that all test data will be measured against the same standard.

With the yarn sample 16 secured in the clamps 14 and 15, the loading lever 35 may be moved clear of the lower end of rod 23. The crank handle 22 may then be manipulated to rotate the wheel 19 and the clamp 14 in a direction tending to untwist the twist in yarn 16. Generally, this will be in the direction of the arrow 39 seen in FIG. 2. Initially, the lower clamp 15 and rod 23 will rotate in a counterclockwise direction as viewed from above until the portion 30 of the arm 28 engages the stop 31. Thereafter, further rotation of the clamp 14 will untwist the yarn since clamp 15 will be restrained against further rotation in the counterclockwise direction. This action is continued until the twist is entirely removed with all single strands of the yarn parallel. The detent finger 21 cooperating with the serrated edge 20 of wheel 19 prevents reverse rotation of the wheel 19.

Having completely removed the twist, the lever element 33 of counter 32 may be manipulated by the operator. Actuation of lever element 33 advances the counter 32 while rotating stop 31 to release the arm 28. The elastic recovery of the yarn will cause the lower clamp 15 with the rod 23 to rotate through a complete revolution until arm 28 again encounters stop 31 on the counter. Lever element 33 is manipulated a second time to advance the counter again and release the arm 28 to undergo a further complete revolution. This operation continues repeatedly until substantially all of the yarn twist that is elastically retained in the yarn has been recovered. At the conclusion of the test, if there is any rotation of the rod 23 to move arm 28 through less than a full revolution beyond the stop 31 after its final release, the angle of such rotation can be read from the calibrated disk 34 beneath the arm 28. As best seen in FIG. 3, the disk 34 is calibrated in tenths of a circle or revolution.

It will be understood by those skilled in the art that the yarn 16 will tend to elongate as it is untwisted and to shorten as it regains its original twisted condition. This longitudinal movement is accommodated by the free hanging rod 23 passing through apertures 24 and 25. The clearance between the rod 23 and apertures 24 and 25 is chosen to afford free movement while steadying the rod and preventing undue pendulum action. In addition, the restraint on the lateral movement of the rod 23 prevents the arm 28 from disengaging from the stop 31 until the counter 32 is actuated.

When the test is completed the degree of yarn twist set is indicated by the reading obtained from counter 32 and calibrated disk 34. It will be understood that a given length of yarn which is known subjectively to be satisfactory will first be measured on the device to obtain a reference standard. Subsequent yarn samples will be compared against said standard and accepted or rejected depending upon the extent of departure from the predetermined standard value. Since no two types of yarn will have the same characteristics, it is not possible to afford any criterion other than that which is developed empirically by the user.

Referring now to FIGS. 4 to 7, inclusive, there is shown a second embodiment of the apparatus in accordance with the subject invention. The structure for holding the yarn sample and for untwisting the sample is substantially the same as that previously described with reference to FIG. 1. However, the arrangement for indicating the amount of yarn twist recovery is substantially different. The lower yarn clamp 15 is mounted at the top of a hollow brass tube 40 whose lower end telescopes over a vertical rod or wire 41 supported in an upstanding manner from the lower horizontal portion 42 of the bracket assembly 43 secured to the standard 11 by the bolt 44. Secured intermediate the ends of the tube 40 is a permanent magnet vane 45 passing through an aperture 46 in the upper horizontal portion 47 of bracket 43. The bracket assembly 43 is made of non-magnetic material and has secured to the underside of portion 47 an electric field structure 50 having a pair of coils 48 and 49 mounted on a laminated core 51. The core 51 has pole projections 52 and 53, best seen in FIG. 6, which cooperate with the magnetic vane 45 for inducing a voltage in the windings 48 and 49 as the vane 45 rotates therebetween.

Also mounted on the portion 47 of bracket assembly 43 is a stop lever 54 arranged to slide within a sleeve 55 secured to the frame portion 47. While not shown in the drawings, the windings 48 and 49 may be connected in series and connected to instrumentation of well known manner for indicating the time-voltage characteristic produced thereby.

The operation of the test apparatus of FIGS. 4 to 7 will be substantially the same as that described above in connection with FIG. 1. The standard sample of yarn will be secured between clamps 14 and 15, the lock member 54 manipulated to interfere with vane 45 and prevent rotation thereof, and the wheel 19 will be rotated to remove the twist in the yarn. When all of the twist has been removed, the lever 54 is released to free the magnetic vane and the lower clamp 15 for rotation under the elastic return stress in the yarn. The time-voltage output characteristic from the electric generating device will be a function of the angular velocity of the vane and, in turn, a function of the extent to which the yarn recovers its twist. That is, the signal generated by the device 50 will be proportional to the angular velocity of the lower gripping element or clamp 15 in the retwisting direction. If this output characteristic is recorded on a chart recorder, it can be compared with a standard curve to determine degree of similarity or dissimilarity.

The device may be used to test the characteristics of yarn having various degrees of twist. That is, the yarn may have any number of turns per inch and be capable of testing on the subject apparatus. It should be understood, however, that a given sample must be compared with a standard having initially substantially the same number of turns per inch. While there is no limitation, therefore, on the number of turns per inch of the yarn to be tested, it may be desirable in the higher ranges of twist, say 5 to 30 turns per inch, to replace the manual untwisting wheel 19 with a motor driven mechanism for effecting the removal of the yarn twist. Primarily, the subject method and device are aimed at testing of yarns of thermoplastic fibers or blends of thermoplastic and natural fibers that have been subjected to elevated temperatures (e.g., 200° to 300°F) for the purpose of "fixing" the ply twist in the yarn. However, since the device measures torsional properties in a strand, the concept is believed applicable to the measurement of twist set in natural fibers, e.g., wool, which have been conditioned in any suitable way such as by wetting or steaming to aid in twist retention.

Having described the subject invention with reference to the presently preferred embodiments thereof, it will be understood by those skilled in the subject art that numerous changes in detail may be effected without departing from the true spirit of the invention as defined in the appended claims.

I claim:

1. The method of measuring twist set in yarn comprising the steps of untwisting a predetermined length of yarn until it is free from twist, thereafter permitting said length of yarn to recover essentially freely substantially all twist elastically retained therein, and determining the amount of twist so recovered.

2. Apparatus for measuring twist set in yarn comprising in combination first means for mounting a length of yarn, means coupled thereto for manipulating said first means to untwist said yarn, means for releasing said first means for permitting said yarn to recover without significant restraint substantially all twist elastically retained therein, and means for providing an indication of the amount of twist so recovered.

3. Apparatus according to claim 2, wherein said first means comprises a pair of gripping elements mounted for gripping respective opposite ends of said yarn, said means for manipulating comprises means for causing relative rotation of said gripping elements in a first direction to untwist said yarn, and said means for releasing comprises means for releasing one of said gripping elements for unrestrained relative rotation in the opposite direction.

4. Apparatus according to claim 3, wherein said means for indicating twist comprises means coupled to said one gripping element for measuring and indicating the magnitude of the angular rotation of said one gripping element in said opposite direction.

5. Apparatus according to claim 4, wherein said measuring and indicating means comprises means for counting the number of complete revolutions of said one gripping element in said opposite direction, and means for determining and manifesting the fractional rotation of said one gripping element in said opposite direction beyond said complete revolutions.

6. Apparatus according to claim 3, wherein said means for indicating twist comprises means for generating a signal proportional to the angular velocity of said one gripping element in said opposite direction.

7. Apparatus according to claim 6, wherein said generating means comprises an electric generator for generating a signal as a function of said angular velocity.

8. Apparatus for measuring twist set in yarn comprising first and second means for gripping respective opposite ends of a standardized length of yarn, means for rotating said first means in one direction to remove the twist in said yarn, means for preventing rotation of said second means in the same direction, means for preventing reverse rotation of said first means, means for releasing said second means for rotation in said one direction, and means for providing a manifestation as a function of the degree to which said yarn returns to its original twisted condition.

* * * * *